United States Patent
Gammon

(10) Patent No.: US 10,495,536 B2
(45) Date of Patent: Dec. 3, 2019

(54) DIFFERENTIAL PRESSURE GAUGE INCLUDING ADJUSTABLE SENSOR POSITIONING MECHANISM

(71) Applicant: GAMMON TECHNICAL PRODUCTS, INC., Manasquan, NJ (US)

(72) Inventor: James H. Gammon, Manasquan, NJ (US)

(73) Assignee: GAMMON TECHNICAL PRODUCTS, INC., Manasquan, NJ (US)

( * ) Notice: Subject to any disclaimer, the term of this patent is extended or adjusted under 35 U.S.C. 154(b) by 148 days.

(21) Appl. No.: 15/840,130

(22) Filed: Dec. 13, 2017

(65) Prior Publication Data

US 2018/0164173 A1  Jun. 14, 2018

Related U.S. Application Data

(60) Provisional application No. 62/433,288, filed on Dec. 13, 2016.

(51) Int. Cl.
| | |
|---|---|
| *G01L 13/02* | (2006.01) |
| *B01D 46/00* | (2006.01) |
| *G01L 13/06* | (2006.01) |
| *G01L 7/16* | (2006.01) |
| *G01L 9/00* | (2006.01) |
| *G01L 13/00* | (2006.01) |

(52) U.S. Cl.
CPC .......... *G01L 13/02* (2013.01); *B01D 46/0086* (2013.01); *G01L 7/163* (2013.01); *G01L 7/166* (2013.01); *G01L 9/0089* (2013.01); *G01L 13/00* (2013.01); *G01L 13/06* (2013.01)

(58) Field of Classification Search
CPC .......... G01L 13/02; G01L 7/163; G01L 7/166; G01L 7/16; G01L 9/0089; G01L 13/00; G01L 13/06; B01D 46/0086; G01B 7/30
See application file for complete search history.

(56) References Cited

U.S. PATENT DOCUMENTS

| | | | |
|---|---|---|---|
| 1,220,488 | A | 3/1917 | Bailey |
| 3,182,630 | A | 5/1965 | Claeys |
| 3,610,046 | A | 10/1971 | Lissau |
| 3,630,071 | A | 12/1971 | Newhall |
| 4,030,368 | A | 6/1977 | Runge |
| 4,143,545 | A | 3/1979 | Sitabkhan |

(Continued)

*Primary Examiner* — Harshad R Patel
*Assistant Examiner* — Nigel H Plumb
(74) *Attorney, Agent, or Firm* — Shumaker, Loop & Kendrick, LLP; James D. Miller

(57) ABSTRACT

A differential pressure gauge for measuring a difference in pressure present between a low pressure portion of a fluid and a high pressure portion of the fluid includes a cylinder and a housing. The cylinder includes an opening. The housing includes an opening. A piston extends from a first end having a visual indicator to a second end having a remote indicator. The first end of the piston is in fluid communication with the high pressure portion of the fluid and the second end of the piston is in fluid communication with the low pressure portion of the fluid. A sensor is configured to sense a presence of the remote indicator when the remote indicator is within a sensing range of the sensor. The sensor is coupled to a sensor positioning mechanism for adjusting a position of the sensor with respect to the axial direction of the housing.

20 Claims, 3 Drawing Sheets

(56) References Cited

U.S. PATENT DOCUMENTS

| | | |
|---|---|---|
| 4,366,717 A | 1/1983 | Foord et al. |
| 4,717,873 A | 1/1988 | Carr, Jr. et al. |
| 9,057,654 B2 | 6/2015 | Gammon |
| 2005/0150304 A1 | 7/2005 | Gustafson et al. |
| 2012/0036937 A1 | 2/2012 | Sprenger et al. |
| 2013/0291645 A1 | 11/2013 | Gammon |

DIFFERENTIAL PRESSURE GAUGE INCLUDING ADJUSTABLE SENSOR POSITIONING MECHANISM

CROSS-REFERENCE TO RELATED APPLICATION

This application claims priority to U.S. Provisional Patent Application Ser. No. 62/433,288, filed Dec. 13, 2016, the entire disclosure of which is hereby incorporated herein by reference.

FIELD OF THE INVENTION

The present disclosure relates to a differential pressure gauge, and more particularly, to a differential pressure gauge having a sensor for determining when a maximum allowable pressure difference is detected between a high pressure side and a low pressure side of the differential pressure gauge.

BACKGROUND OF THE INVENTION

It is often beneficial to monitor the condition of filter elements. One of the most common ways to monitor the condition of filter elements is to measure a pressure drop across a filter element using a differential pressure gauge. A measurable difference in pressure occurs over time because, in a clean filter, a fluid being filtered flows freely without restriction, and in a filter filled with dirt and debris, the fluid flow is restricted. Accordingly, a fluid flowing through a clogged filter will have a higher pressure before entering the filter and a lower pressure after exiting the filter.

Many types of differential pressure gauges are available. For example, a piston-type gauge can be used to measure pressure drop. A piston-type gauge typically includes a piston that is tightly fit into a cylinder, with a spring attached to one end of the piston. A fluid having a higher pressure is directed by tubing to one end of the piston while a fluid having a lower pressure is directed by tubing to an opposite end of the piston. The spring is configured to oppose motion of the piston in a direction from the higher pressure source to the lower pressure source. The pressure from each respective fluid source exerts a force on each respective end of the piston. When the difference in pressure between the two ends of the pistons is zero, the spring does not compress or extend and the piston remains at rest. However, as the difference in pressure becomes greater between the two ends of the piston, the piston is displaced. The spring compresses or extends until the force applied by the spring to the piston is equal to the net force exerted on the piston due to differential pressure. By knowing the relationship between the compression or extension of the spring and the resulting force applied by the spring, the position of the piston can be used to indicate the difference in pressure between the two ends of the piston.

The continued accumulation of debris within the filter element causes the pressure drop experienced across the filter element to continue to increase during extended use of the filter element. The filter element may eventually reach a point wherein the pressure drop experienced across the filter element may cause a fluid system utilizing the filter element to be damaged or to operate less efficiently than desired. It is accordingly beneficial to prevent an occurrence of such a fluid system operating when the pressure drop experienced across such a filter element exceeds a pre-selected maximum value indicating that the filter element is in need of replacement or maintenance.

It would therefore be desirable to provide a differential pressure gauge that determines and communicates to a user when a pre-selected maximum pressure drop is experienced across the filter element associated with the differential pressure gauge.

SUMMARY OF THE INVENTION

Compatible and attuned with the present invention, a differential pressure gauge capable of determining and communicating when a maximum pressure drop is experienced across a component associated with the differential pressure gauge has surprisingly been discovered.

In one embodiment of the invention, a differential pressure gauge for measuring a difference in pressure present between a low pressure portion of a fluid and a high pressure portion of the fluid is disclosed. The differential pressure gauge comprises a cylinder including an opening extending in an axial direction of the cylinder, a housing including an opening extending in an axial direction of the housing, and a piston extending in an axial direction thereof from a first end having a visual indicator to a second end having a remote indicator. The first end of the piston is slidably disposed in the cylinder and is in fluid communication with the high pressure portion of the fluid and the second end of the piston is slidably disposed in the housing and is in fluid communication with the low pressure portion of the fluid. A sensor is configured to sense a presence of the remote indicator when the remote indicator is within a sensing range of the sensor. The sensor is coupled to a sensor positioning mechanism for adjusting a position of the sensor with respect to the axial direction of the housing.

In another embodiment of the invention, a differential pressure gauge comprises a cylinder including an opening extending in an axial direction of the cylinder, a housing including an opening extending in an axial direction of the housing, and a piston extending in an axial direction thereof from a first end having a visual indicator to a second end having a remote indicator formed from a ferrous material. The first end of the piston is slidably disposed in the cylinder and is in fluid communication with the high pressure portion of the fluid and the second end of the piston is slidably disposed in the housing and is in fluid communication with the low pressure portion of the fluid. A spring urges the piston towards the high pressure portion of the fluid. A ferrous material sensor is configured to sense a presence of the remote indicator when the remote indicator is within a sensing range of the sensor. The sensor is coupled to a sensor positioning mechanism for adjusting a position of the sensor with respect to the axial direction of the housing. A plate is disposed adjacent the housing. The plate includes a slot extending longitudinally in a direction parallel to the axial direction of the piston. A portion of the sensor positioning mechanism is slidably disposed within the slot. A plurality of indicia is disposed on the plate adjacent the slot. Each of the indicia corresponds to a user selected value of the difference in pressure present between the low pressure portion of the fluid and the high pressure portion of the fluid at which the presence of the remote indicator is sensed by the sensor.

According to a further aspect of the invention, an outer surface of the housing includes at least one stopping surface for delimiting the position of the sensor with respect to the axial direction of the housing. The at least one stopping surface is arranged transverse to the axial direction of the housing. The at least one stopping surface includes a first stopping surface for delimiting the position of the sensor with respect to the axial direction of the housing in a first direction and a second stopping surface for delimiting the position of the sensor with respect to the axial direction of the housing in a second direction arranged opposite the first direction. The first stopping surface and the second stopping surface are formed at opposing ends of an indented portion of the housing and the sensor is disposed within the indented portion of the housing. The at least one stopping surface prevents the sensor from being positioned at a position with respect to the axial direction of the housing wherein the remote indicator does not reach the sensing range of the sensor when the remote indicator slides within the opening of the housing towards the sensor.

According to yet another aspect of the invention, the sensing of the presence of the remote indicator by the sensor corresponds to the difference in pressure present between the low pressure portion of the fluid and the high pressure portion of the fluid being at a pre-selected value. The pre-selected value corresponds to a maximum allowable difference in pressure present between the low pressure portion of the fluid and the high pressure portion of the fluid. The high pressure portion of the fluid may enter the cylinder from a position upstream of a filter element associated with the differential pressure gauge and the low pressure portion of the fluid may enter the housing from a position downstream of the filter element.

The differential pressure gauge may further comprise a plate disposed adjacent the housing. The plate includes a slot extending longitudinally in a direction parallel to the axial direction of the piston. A portion of the sensor positioning mechanism is slidably disposed within the slot. A plurality of indicia is disposed on the plate adjacent the slot. Each of the indicia is spaced from an adjacent one of the indicia in the longitudinal direction of the slot. The sensor positioning mechanism includes a target pointing at one of the indicia disposed on the plate, wherein sliding movement of the sensor positioning mechanism within the slot causes which one of the indicia the target points at to vary. Each of the indicia corresponds to a user selected value of the difference in pressure present between the low pressure portion of the fluid and the high pressure portion of the fluid at which the presence of the remote indicator is sensed by the sensor.

The differential pressure gauge may further include a plurality of indicia, wherein the plurality of the indicia is one of disposed on the cylinder or disposed adjacent the cylinder. The cylinder may be formed from a transparent material to provide visual access to the visual indicator of the piston. Each of the indicia corresponds to a measured difference in pressure present between the low pressure portion of the fluid and the high pressure portion of the fluid. A position of the visual indicator relative to the indicia is dependent on the difference in pressure present between the low pressure portion of the fluid and the high pressure portion of the fluid.

The differential pressure gauge further comprises a spring opposing motion of the piston in a direction extending from the first end of the piston toward the second end of the piston. The spring may be a compression spring disposed between the visual indicator of the piston and a portion of the housing.

According to another aspect of the invention, the remote indicator is formed from a ferrous material and the sensor is configured to sense the presence of a ferrous material.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
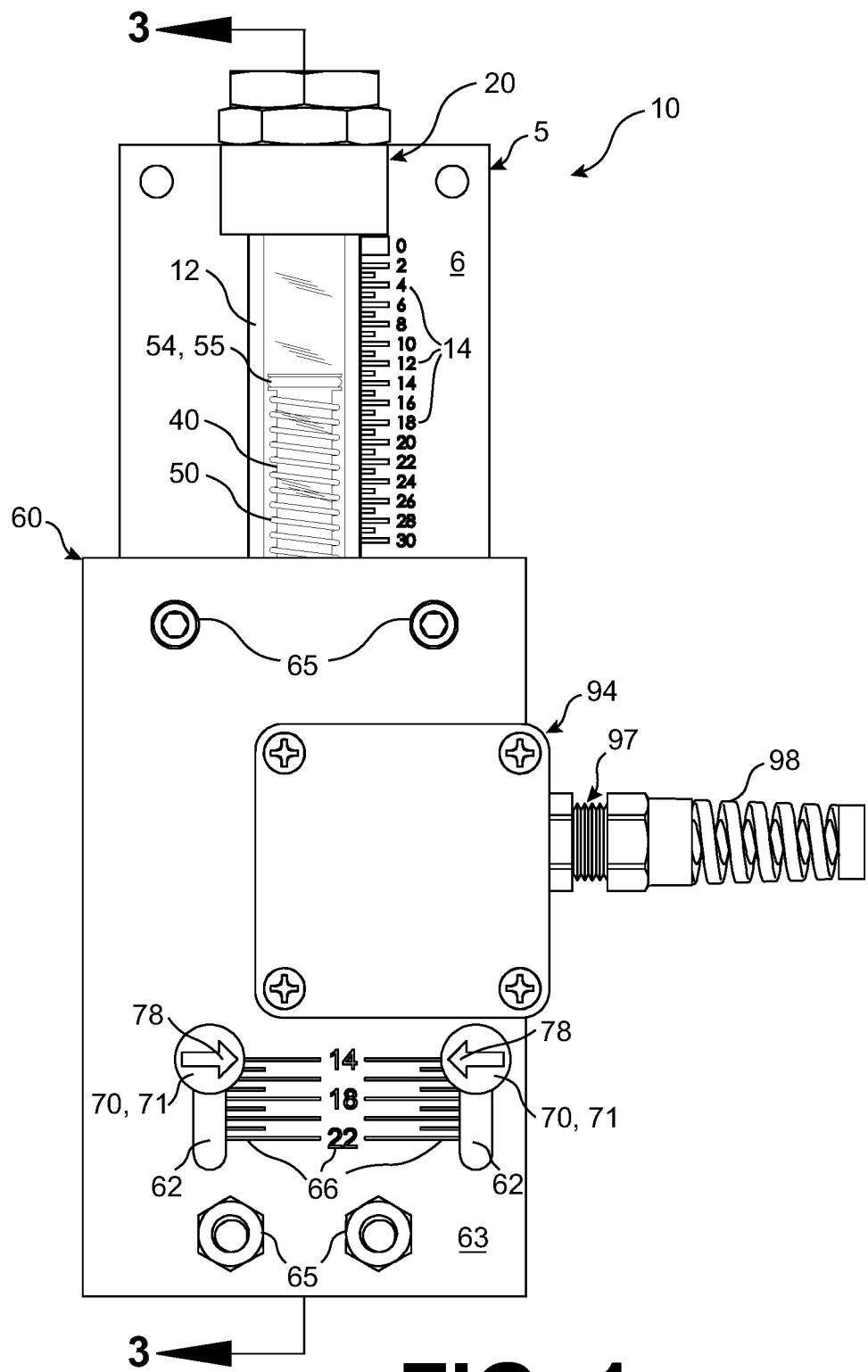
FIG. 1 is a front elevational view of a differential pressure gauge according to an embodiment of the invention.
Figure 2:
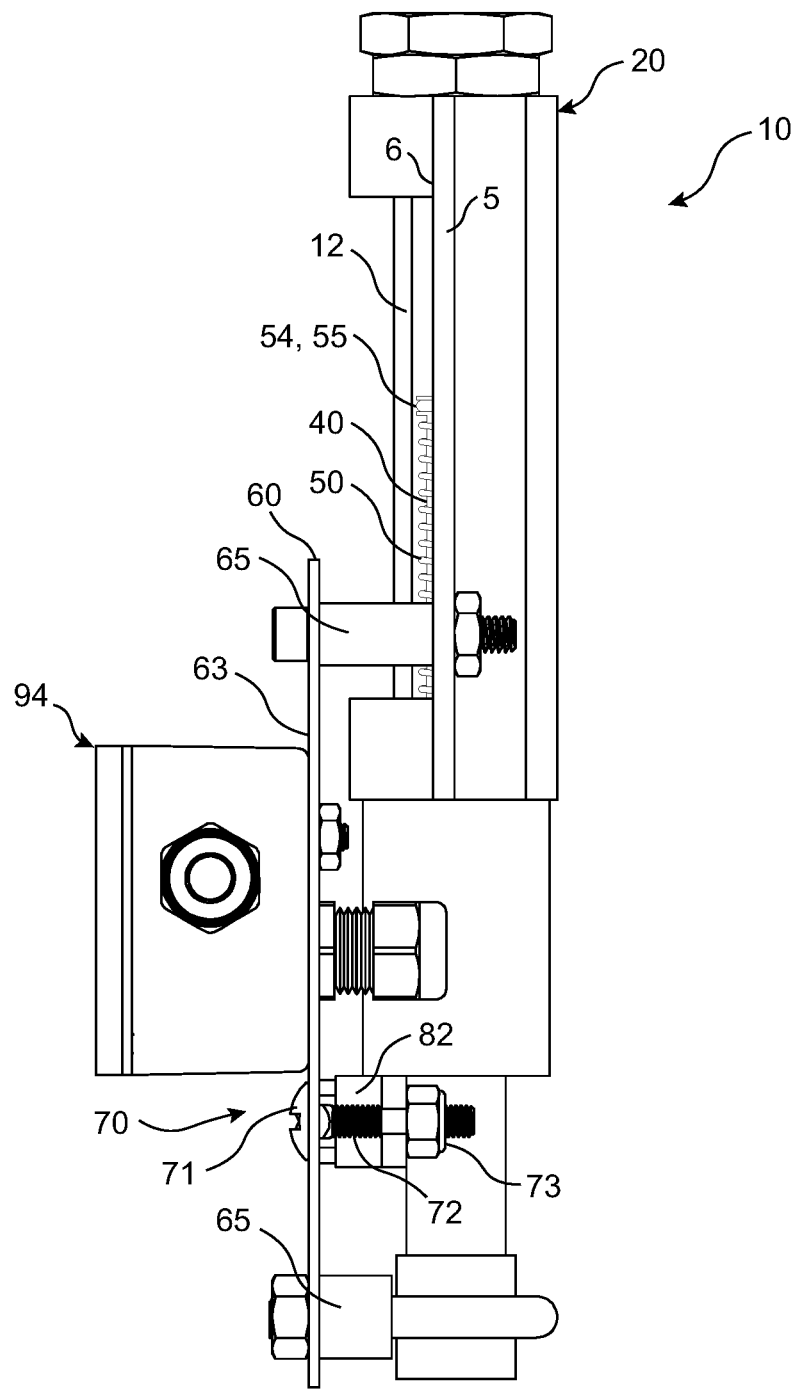
FIG. 2 is a side elevational view of the differential pressure gauge of FIG. 1.
Figure 3:
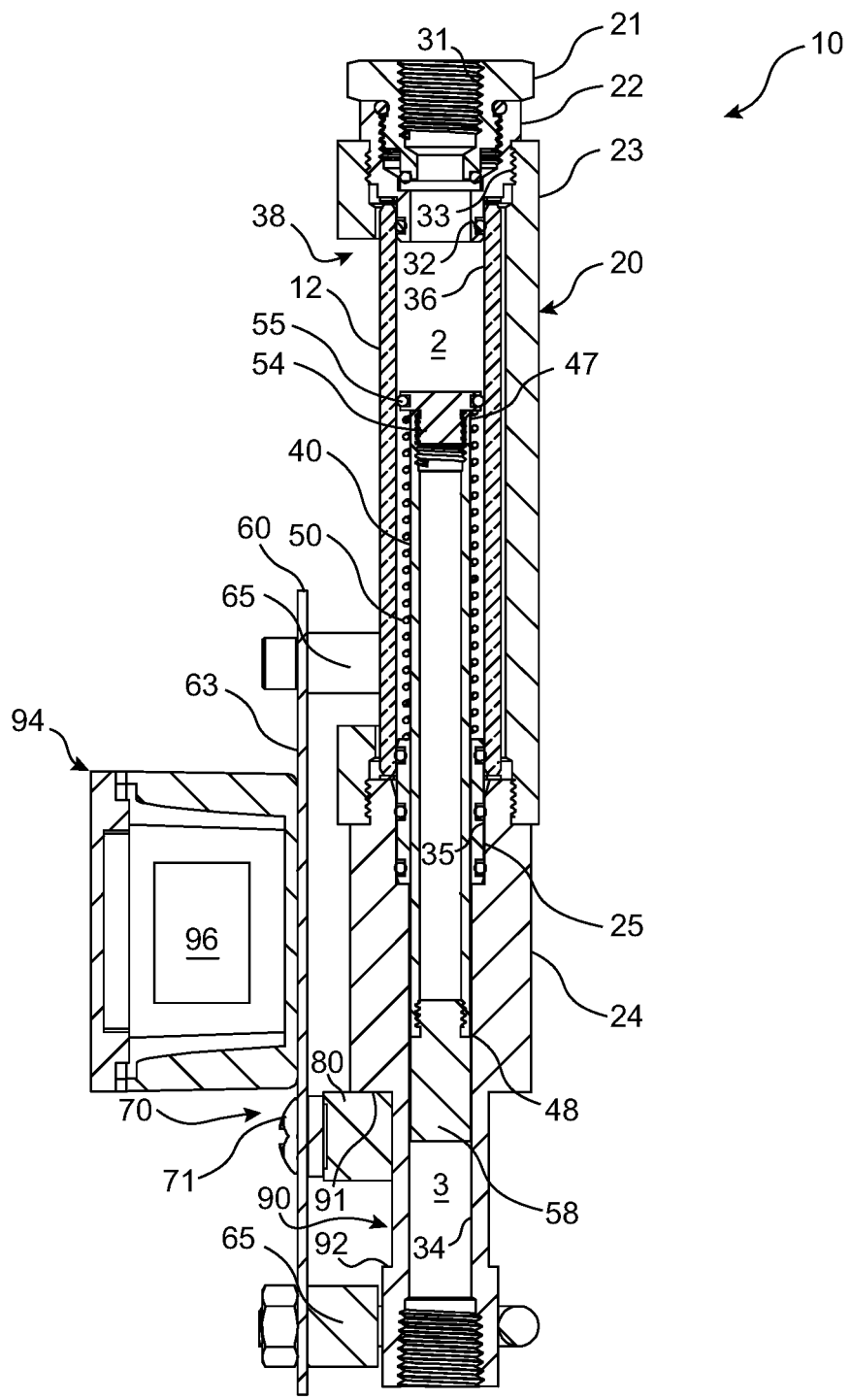
FIG. 3 is a cross-sectional elevational view of the differential pressure gauge taken through section lines 3-3 of FIG. 1.

FIGS. 1-3 illustrate a differential pressure gauge 10 according to an embodiment of the invention. The differential pressure gauge 10 includes a cylinder 12, a housing 20, a piston 40, and a spring 50. The differential pressure gauge 10 is configured to measure a pressure difference present between two spaced apart portions of a fluid conveying passageway. For example, the differential pressure gauge 10 may be configured to determine how much of a pressure drop is experienced by a fluid when passing through a filter element associated with removing particles or debris from the fluid. As the filter element becomes loaded with the debris, the pressure drop experienced as the fluid passes through the filter element will increase. The fluid passageway accordingly includes a high pressure portion disposed upstream of the filter element with respect to a direction of flow of the fluid through the passageway and a low pressure portion disposed downstream of the filter element with respect to the direction of the flow of the fluid through the passageway. As used hereinafter, it is understood that the phrases "high pressure" and "low pressure" do not refer to absolute pressure values. Instead, the phrase "high pressure" refers to the pressure of the fluid prior to passing through the filter element while the phrase "low pressure" refers to the pressure of the fluid after passing through the filter element. It should also be understood that the differential pressure gauge 10 may be configured for determining the pressure drop experienced across any type of component causing a fluid passing therethrough to experience a varying pressure drop depending on a condition of the component. However, hereinafter, the differential pressure gauge 10 will be described with reference to a filter element associated with a fluid passageway of a fluid conveying system.

The housing 20 may include a plurality of housing members coupled to each other. The housing members may include a first housing member 21, a second housing member 22, a third housing member 23, a fourth housing member 24, and a fifth housing member 25. With reference to FIG. 3, the first housing member 21 includes an axially extending first opening 31 defining an inner surface thereof. The second housing member 22 includes an axially extending second opening 32 defining an inner surface thereof. The third housing member 23 includes an axially extending third opening 33 defining an inner surface thereof. The fourth housing member 24 includes an axially extending fourth opening 34 defining an inner surface thereof. The fifth housing member 25 includes an axially extending fifth opening 35 defining an inner surface thereof. The cylinder 12 includes an axially extending sixth opening 36 defining an inner surface thereof. Each of the first opening 31, the second opening 32, the third opening 33, the fourth opening 34, the fifth opening 35, and the sixth opening 36 may be formed concentrically with a common central axis.

The first housing member 21 includes a threaded outer surface configured for engagement with a threaded portion of the inner surface of the second housing member 22 to couple the first housing member 21 to the second housing member 22. At least one O-ring or gasket may be disposed between the first housing member 21 and the second housing member 22 to prevent a flow of a fluid from passing therebetween. A threaded portion of an outer surface of the second housing member 22 is configured for engagement with a first threaded portion of the inner surface of the third housing member 23 to couple the second housing member 22 to the third housing member 23. A second threaded portion of the inner surface of the third housing member 23 is configured for engagement with a threaded portion of an outer surface of the fourth housing member 24 to couple the third housing member 23 to the fourth housing member 24. The fifth housing member 25 is received in an indented portion of the fourth opening 34 formed in the fourth housing member 24.

The cylinder 12 is received in the third opening 33 of the third housing member 23 with a first end of the cylinder 12 abutting the second housing member 22 and a second end of the cylinder 12 abutting an end of the fourth housing member 24. An end portion of the second housing member 22 is received into the sixth opening 36 of the cylinder 12. At least one O-ring or gasket may be disposed between the inner surface of the cylinder 12 and an outer surface of the end portion of the second housing member 22 to prevent a flow of fluid therebetween. The second end of the cylinder 12 is disposed between the third housing member 23 and the fifth housing member 25. At least one O-ring or gasket may be disposed between an outer surface of the fifth housing member 25 and the inner surface of the cylinder 12 to prevent a flow of the fluid therebetween. At least one O-ring or gasket may also be disposed between the outer surface of the fifth housing member 25 and the inner surface of the fourth housing member 24 to prevent a flow of the fluid therebetween.

The first housing member 21 may include a threaded inner surface for coupling to a connector or adapter (not shown) in fluid communication with the high pressure portion of the fluid upstream of the filter element while the fourth housing member 24 may include a threaded inner surface for coupling to a connector or adapter (not shown) in fluid communication with the low pressure portion of the fluid downstream of the filter element. However, any structure suitable for routing the high pressure portion of the fluid to the first opening 31 of the first housing member 21 or the low pressure portion of the fluid to the fourth opening 34 of the fourth housing member 24 may be used without departing from the scope of the present invention.

Additionally, although the housing members 21, 22, 23, 24, 25 are disclosed as separate components coupled to each other, it is understood by one skilled in the art that the housing 20 may alternatively be formed of more or fewer housing members having the same general structure and features as the housing 20 illustrated in FIGS. 1-3 without departing from the scope of the present invention. In some embodiments, the housing 20 may be divided into two spaced apart portions with each of the portions receiving or coupled to one end of the cylinder 12, as desired. In other embodiments, two or more of the identified housing members 21, 22, 23, 24, 25 may be formed integrally as a single continuous component, as desired.

The cylinder 12 may be formed from a transparent material to allow for visual access to an interior of the cylinder 12 defined by the sixth opening 36 thereof. The cylinder 12 may be formed from a glass material, for example. The third housing member 23 may further include a window 38 formed in a side surface thereof for providing visual access to at least a portion of the cylinder 12.

Referring to FIG. 1, a plurality of first indicia 14 may be formed on the cylinder 12 or immediately adjacent the cylinder 12. In the embodiment shown in FIG. 1, the first indicia 14 are formed adjacent the cylinder 12 on a first mounting plate 5. The first mounting plate 5 may be substantially planar and may include a front surface 6 extending adjacent an outer surface of the cylinder 12. A plane defined by the front surface 6 of the first mounting plate 5 may pass through the cylinder 12. Each of the first indicia 14 may be spaced from an adjacent one of the first indicia 14 in an axial direction of the cylinder 12. Each of the first indicia 14 may represent a pressure difference present between the low pressure portion of the fluid and the high pressure portion of the fluid as determined by operation of the differential pressure gauge 10. In the embodiment shown, each of the first indicia 14 corresponds to a 1 psi difference in the differential pressure and range from representing 0 psi to 30 psi. It is understood that alternative gradations and ranges of differential pressure values may be represented by the first indicia 14 without departing from the scope of the pressure invention.

The piston 40 extends axially from a first end 47 having a visual indicator 54 to a second end 48 having a remote indicator 58. The visual indicator 54 may include a threaded portion configured to mate with a corresponding threaded portion formed at the first end 47 of the piston 40 while the remote indicator 58 may include a threaded portion configured to mate with a corresponding threaded portion formed at the second end 48 of the piston 40. However, it is understood that the visual indicator 54 and the remote indicator 58 may each be coupled to the piston 40 using any known structure or coupling means, as desired. The remote indicator 58 may be formed of a material configured for detection by a sensor, as explained in greater detail hereinafter. The remote indicator 58 may for example be formed of a ferrous material. The remote indicator 58 may accordingly be a magnet.

The piston 40 is slidably disposed in each of a portion of the sixth opening 36 defining the interior surface of the cylinder 12, a portion of the fifth opening 35 defining the interior surface of the fifth housing member 25, and a portion of the fourth opening 34 defining the interior surface of the fourth housing member 24. The first end 47 of the piston 40 having the visual indicator 54 is disposed within the sixth opening 36 of the cylinder 12 and the second end 48 of the piston 40 having the remote indicator 58 is disposed within the fourth opening 34 of the fourth housing member 24 during operational use of the differential pressure gauge 10. The piston 40 is configured to slide within the cylinder 12 and the portions of the housing 20 in the axial direction of the piston 40.

The piston 40 and the remote indicator 58 have substantially the same outer diameter while the visual indicator 54 includes an indicator ring 55 extending radially outwardly and having a larger outer diameter than the piston 40 and the remote indicator 58. A slight clearance may be present between the radially outermost surface of the indicator ring 55 and the inner surface of the cylinder 12 to allow for the fluid to pass around the indicator ring 55 and fill the remainder of the cylinder 12.

The portions of the piston 40 and the remote indicator 58 having the common outer diameter are configured to be closely fit into the fifth opening 35 of the fifth housing member 25 and a portion of the fourth opening 34 of the fourth housing member 24 formed immediately adjacent the fifth opening 35. The close fit of the piston 40 and the remote indicator 58 into the fourth opening 34 and the fifth opening 35 is configured to prevent a flow of the fluid from passing between the piston 40 and either of the fourth housing member 24 and the fifth housing member 25. This in turn prevents fluid communication between the first end 47 and the second end 48 of the piston 40.

The spring 50 is disposed within the sixth opening 36 of the cylinder 12. A first end of the spring 50 may abut the indicator ring 55 of the visual indicator 54 and a second end of the spring 50 may abut an end of the fifth housing member 25 extending axially into the sixth opening 36 of the cylinder 12. The spring 50 is shown as a compression spring and is configured to have a linear relationship between a change in distance between the opposing ends of the spring 50 and a force applied by the spring 50 in response to the change in distance. However, any spring-like component having a linear relationship between a displacement thereof and a resulting force applied by the spring-like component may be used without departing from the scope of the present invention. For example, in contrast to the compression spring, an extension spring may be disposed between and coupled to each of the second housing member 22 and the indicator ring 55 while having substantially the same effect as the compression spring 50 shown in FIGS. 1-3.

The first opening 31 of the first housing member 21, a portion of the second opening 32 of the second housing member 22, and a portion of the sixth opening 36 of the cylinder 12 cooperate to form a high pressure chamber 2 for receiving a portion of the fluid when at a high pressure prior to flowing through the filter element associated with the fluid passageway. The fourth opening 34 of the fourth housing element 24 forms a low pressure chamber 3 for receiving a portion of the fluid when at a low pressure after flowing through the filter element associated with the fluid passageway. The high pressure chamber 2 includes the high pressure fluid applying a force to the first end 47 of the piston 40 for urging the piston 40 axially towards the low pressure chamber 3 in a direction compressing the spring 50. The low pressure chamber 3 includes the low pressure fluid applying a force to the second end 48 of the piston 40 for urging the piston 40 axially towards the high pressure chamber 2.

The differential pressure gauge 10 further includes a second mounting plate 60 spaced from the cylinder 12 in a direction perpendicular to the axial direction of the cylinder 12. In the embodiment shown, the second mounting plate 60 is arranged parallel to the first mounting plate 5. The second mounting plate 60 may be coupled to the remainder of the differential pressure gauge 10 by a plurality of fasteners 65 extending between the second mounting plate 60 and one or both of the first mounting plate 5 and the housing 20. In the embodiment shown in FIGS. 1-3, a first pair of the fasteners 65 extends between the first mounting plate 5 and the second mounting plate 60 while a second pair of the fasteners is connected via a turnaround section surrounding the fourth housing member 24. Alternative configurations of the fasteners 65 may be utilized without departing from the scope of the present invention.

The second mounting plate 60 includes at least one opening or slot 62 extending in a direction parallel to the axial direction of the piston 40. In the embodiment shown, the second mounting plate 60 includes two of the slots 62 spaced apart from each other and arranged in parallel. A plurality of second indicia 66 is formed on a front surface 63 of the second mounting plate 60 intermediate the parallel arranged slots 62. The second indicia 66 are spaced from each other in the axial direction of the slots 62. Each of the second indicia 66 may represent a pressure differential as determined by the differential pressure gauge 10. In the embodiment shown, each of the second indicia 66 corresponds to a 1 psi difference in the differential pressure and range from a pressure value of 14 psi to a pressure value of 22 psi. It is understood that alternative gradations and ranges of differential pressure values may be represented by the second indicia 66 without departing from the scope of the pressure invention.

The parallel arranged slots 62 are configured to slidably receive a sensor positioning mechanism 70 therein. The sensor positioning mechanism 70 is coupled to a sensor housing 82 having a sensor 80 disposed therein. The sensor 80 is configured to detect the presence of the remote indicator 58 when the remote indicator 58 is within a sensing range of the sensor 80. The sensor 80 may be a ferrous metal sensor configured to detect the presence of a ferrous material such as the remote indicator 58, as desired. The sensor 80 may be configured to detect the presence of a magnetic field, as desired. The sensor 80 may be configured as a switch wherein the sensing of the remote indicator 58 causes the sensor 80 to generate a signal, such as an electrical signal, when a certain threshold for sensing the remote indicator 58 is met. The sensor positioning mechanism 70 is configured to adjust a position of the sensor 80 relative to the axial direction of the slots 62 and hence relative to the axial direction of the piston 40.

The sensor positioning mechanism 70 includes a pair of flanged portions 71 disposed in front of the front surface 63 of the second mounting plate 60 and a pair of shaft portions 72 extending rearwardly from the flanged portions 71 and towards the housing 20. Each of the shaft portions 72 may be threaded and configured to receive a nut 73 at an end thereof opposite the respective flanged portion 71. Each of the shaft portions 72 may be sized to have an outer diameter substantially equal to a width of each of the slots 62 to prevent lateral motion of each of the second indicators 70 when sliding within the slots 62. Each of the flanged portions 71 is shown in FIG. 1 as including a marker 78 in the form of an arrow for pointing to one of the second indicia 66 disposed on the second mounting plate 60. The embodiment shown in FIGS. 1-3 includes a pair the markers 78 pointed in opposite inward directions towards the second indicia 66 disposed between the pair of the flanged portions 71 and the corresponding markers 78.

The sensor positioning mechanism 70 may be formed by a pair of parallel arranged carriage bolts, wherein each of the shaft portions 72 forms a shaft of one of the carriage bolts and wherein each of the flanged portions 71 forms a head of one of the carriage bolts. The head of each of the carriage bolts may be etched or indented to form one of the markers 78. Each of the shaft portions 72 may include threading formed along at least a portion thereof for receiving one of the nuts 73, as desired.

The sensor housing 82 is supported by the sensor positioning mechanism 70 and is disposed rearwardly of the second mounting plate 60. The sensor housing 82 may include a pair of openings extending therethrough, wherein each of the openings is configured to receive one of the shaft portions 72 of the sensor positioning mechanism 70. The sensor housing 82 may be coupled to the sensor positioning mechanism 70 by tightening each of the nuts 73 onto each of the shaft portions 72 to compress the sensor housing 82 between the second mounting plate 60 and each of the respective nuts 73.

A repositioning of the sensor positioning mechanism 70, and hence the sensor 80 disposed therein, may be accomplished by a loosening of each of the nuts 73 and a sliding of the shaft portions 72 within the slots 62 of the second mounting plate 60 to a desired new position. The sensor positioning mechanism 70 and hence the corresponding sensor 80 may then be secured to the new position by a retightening of each of the nuts 73. The nuts 73 may be retightened when each of the markers 78 of the sensor positioning mechanism 70 is pointing towards a desired one of the second indicia 66 formed on the second mounting plate 60.

Alternative structures may be utilized for coupling the sensor housing 82 to the sensor positioning mechanism 70 without departing from the scope of the present invention. For example, the sensor housing 82 may be adhered or aggressively joined (such as by welding, brazing, etc.) to the sensor positioning mechanism 70 or may be secured to the sensor positioning mechanism 70 by an alternative type of fastener other than the carriage bolt assembly described herein. The sensor 80 may alternatively be housed in a sensor housing 82 formed integrally with the sensor positioning mechanism 70, as desired.

The use of an alternative structure for the coupling of the sensor housing 82 to the sensor positioning mechanism 70 may further require the use of an alternative structure for securing the position of the sensor positioning mechanism 70 relative to the second mounting plate 60. This is due to the embodiment shown in FIGS. 1-3 utilizing the nuts 73 to both secure the sensor housing 82 to the sensor positioning mechanism 70 as well as to secure a position of the sensor positioning mechanism 70 relative to the second mounting plate 60. For example, one or both of the flanged portions 71 may include an opening (not shown) configured to receive a locking pin (not shown) therein while the second mounting plate 60 may include a plurality of openings (not shown) formed therein also configured to receive the locking pin therein, wherein each of the second indicia 66 formed on the second mounting plate 60 corresponds to one of the openings formed in the second mounting plate 60. The position of the sensor positioning mechanism 70 relative to the second mounting plate 60 may accordingly be secured by reception of the locking pin into each of the opening formed in the flanged portion 71 and one of the openings formed in the second mounting plate 60. However, any structure suitable for securing an axial position of the sensor positioning mechanism 70 and the sensor housing 82 relative to the slots 62 may be used without departing from the scope of the present invention.

As best shown in FIG. 3, the fourth housing member 24 includes an indented portion 90 forming a first stopping surface 91 at one end thereof and a second stopping surface 92 at an opposite end thereof. A rear surface of the sensor 80 or the sensor housing 82 may be configured to be disposed adjacent or in contact with the indented portion 90 of the fourth housing member 24. The first stopping surface 91 extends radially outwardly in a direction perpendicular to the axial direction of the piston 40 for preventing additional motion of the sensor housing 82 in a first direction while the second stopping surface 92 extends radially outwardly in a direction perpendicular to the axial direction of the piston 40 for preventing additional motion of the sensor housing 82 in a second direction opposite the first direction, wherein each of the first direction and the second direction are parallel to the axial direction of the piston 40. As shown with reference to FIG. 1, the first stopping surface 91 and the second stopping surface 92 may be positioned to cause the markers 78 to be moveable along an entirety of the range of the second indicia 66 formed on the front surface 63 of the second mounting plate 60.

The differential pressure gauge 10 further includes a weather-proof enclosure box 94 for receiving electrical components associated with operation of the sensor 80. The enclosure box 94 may for example include a controller 96 (shown schematically in FIG. 3) configured to control operation of the sensor 80. The controller 96 may include a memory, a processor, and at least one instruction set stored to the memory of the controller 96 and executed using the processor. The controller 96 may be configured to send or receive control signals associated with the operation of the differential pressure gauge 10. For example, the controller 96 may be configured to receive a control signal from the sensor 80 when a ferrous material is detected to be in close proximity to the sensor 80. The controller 96 may be further configured to send a control signal to another component associated with the differential pressure gauge 10 in response to the detection of the ferrous material. The communication between the controller 96 and the sensor 80 may be accomplished using one or more wires of cables (not shown) routed between the enclosure box 94 and the sensor 80. At least one fluid tight fitting (not shown) may be disposed at the intersection of the at least one wire or cable and the enclosure box 94 for preventing the entry of fluid into the enclosure box 94.

The enclosure box 94 may further include a power source (not shown) for providing electrical energy to the controller 96 and the sensor 80. The enclosure box 94 may include one or more fluid tight fittings 97 for routing one or more wires or cables 98 into the enclosure box 94. The wires or cables may be configured to communicate electrical power from an external power source (not shown) or may be configured to send or receive control signals associated with the operation of the controller 96 or the sensor 80 directly in the absence of the controller 96, as desired. The controller 96 may, for example, be in signal communication with an exterior computing system associated with operation of a fluid system having the differential pressure gauge 10.

In use, an operator of the differential pressure gauge 10 adjusts the sensor positioning mechanism 70 within the slots 62 of the second mounting plate 60 to place the markers 78 at a selected position relative to the second indicia 66. In the embodiment shown, the user has adjusted the sensor positioning mechanism 70 to a position wherein the markers 78 point to one of the second indicia 66 associated with a 14 psi pressure difference between the high pressure fluid and the low pressure fluid. The adjustment of the sensor positioning mechanism 70 causes the sensor 80 to also be adjusted relative to the indented portion 90 of the outer surface of the fourth housing member 24. As shown in FIGS. 1-3, the positioning of the markers 78 pointing to the second indicia 66 indicating a 14 psi differential pressure corresponds to the sensor 80 abutting the first stopping surface 91 at an end of the indented portion 90. The sensor 80 abutting the first stopping surface 91 corresponds to a minimum pressure differential at which the sensor positioning mechanism 70 may be positioned. As is apparent from a review of FIGS. 1-3, a repositioning of the sensor positioning mechanism 70 to an opposite end of the slots 62 causes the markers 78 to point at one of the second indicia 66 corresponding to a 22 psi pressure differential while the sensor 80 abuts the second stopping surface 92. The sensor 80 abutting the second stopping surface 92 accordingly corresponds to a maximum pressure differential at which the sensor positioning mechanism 70 may be positioned. It is further understood that the sensor positioning mechanism 70 may be positioned at an intermediate position relative to the second indicia 66 (a position indicating a pressure value intermediate 14 psi and 22 psi) wherein the sensor 80 is spaced from each of the first stopping surface 91 and the second stopping surface 92. It is also understood that the range of pressure values of 14 psi to 22 psi is merely illustrative, and that alternative ranges of pressure values may be used without departing from the scope of the present invention.

As explained hereinabove, the repositioning of the sensor positioning mechanism 70 and hence the sensor 80 may include each of the nuts 73 disposed on the shaft portions 72 being rotated until the compressive force applied by the nuts 73 is reduced to an extent that the shaft portions 72 are capable of sliding within the slots 62 to reposition the sensor positioning mechanism 70. The nuts 73 are then retightened to secure the position of the sensor positioning mechanism 70 relative to the second mounting plate 60, which in turn secures the position of the sensor 80 relative to the housing 20. As explained hereinabove, alternative methods of securing the position of the sensor positioning mechanism 70 and hence the sensor 80 may be used without departing from the scope of the present invention so long as the sensor 80 is restrained from moving axially between the first stopping surface 91 and the second stopping surface 92 during use of the differential pressure gauge 10.

The high pressure chamber 2 receives the high pressure fluid and the low pressure chamber 3 receives the low pressure fluid. The high pressure fluid applies a force to the end of the piston 40 having the visual indicator 54 and the low pressure fluid applies a force to the end of the piston 40 having the remote indicator 58. A difference in pressure between the low pressure fluid and the high pressure fluid tends to cause the piston 40 to move in a direction compressing the spring 50. The spring 50 has a stiffness selected to cause the spring 50 to compress a known distance for a given pressure difference present between the low pressure fluid and the high pressure fluid, thereby causing the piston 40 and the indicator ring 55 of the visual indicator 54 to move a preselected distance relative to the first indicia 14. The position of the indicator ring 55 relative to the first indicia 14 provides a visual indication of the pressure difference present between the low pressure fluid and the high pressure fluid to the user of the differential pressure gauge 10.

The differential pressure gauge 10 is further configured to determine when a maximum allowable pressure difference is present between the low pressure fluid and the high pressure fluid. A value of the maximum allowable pressure difference is determined by the user selected position of the sensor positioning mechanism 70, wherein the markers 78 point to the value of the maximum allowable pressure difference value as indicated by the second indicia 66. For example, with reference to FIG. 1, the markers 78 are pointed at the pressure value of 14 psi as indicated by the second indicia 66, thereby indicating that the value of the maximum allowable pressure difference is set to 14 psi. Alternatively, if the markers 78 point to the pressure value of 22 psi as indicated by the second indicia 66, then the value of the maximum allowable pressure difference is set to 22 psi. It is understood that the value of the maximum allowable pressure difference is not a characteristic of the differential pressure gauge 10, but is instead selected by the user based on the desired characteristics of the fluid after having passed through the filter element or other component associated with the differential pressure gauge 10. The value of the maximum allowable pressure difference may be selected to correspond to a known pressure difference present between the low pressure fluid and the high pressure fluid when the filter element is in need of replacement or maintenance to ensure proper operation of any fluid system utilizing the filter element.

As one non-limiting example, a filter element associated with the differential pressure gauge 10 may normally cause a pressure drop of approximately 5 psi when first installed into a fluid system absent of any debris. The filter element may also be considered to be in need of replacement or maintenance when embedded with enough debris to cause a pressure drop of approximately 14 psi across the filter element. The user of the differential pressure gauge 10 accordingly may position the markers 78 of the sensor positioning mechanism 70 to point to the second indicia 66 indicating a maximum allowable pressure difference of 14 psi.

Extended use of the filter element may accordingly result in the pressure difference measured between the low pressure fluid and the high pressure fluid to increase over time due to debris accumulating within the filter element. As the pressure difference is increased, the piston 40 is urged against the force of the spring 50 to cause the piston 40 to move in a direction extending from the high pressure chamber 2 towards the low pressure chamber 3, which in turn causes the remote indicator 58 disposed at the second end 48 of the piston 40 to move in a direction towards the sensor 80. The visual indicator 54 similarly moves in unison with the piston 40 as the pressure difference between the low pressure fluid and the high pressure fluid is increased. A position of the indicator ring 55 extending from the visual indicator 54 relative to the first indicia 14 formed on or adjacent the transparent cylinder 12 accordingly provides an instantaneous visual determination of the pressure difference present between the low pressure fluid and the high pressure fluid to the user.

The sensor 80 is configured to sense the presence of a ferrous material in close proximity to the sensor 80. With reference to FIG. 3, the sensor 80 may for example be configured to sense the presence of the remote indicator 58 when the remote indicator 58 is positioned at a central region of the sensor 80 with respect to the axial direction of the piston 40. The sensor 80 may accordingly be configured to continuously monitor for the detection of the remote indicator 58 during use of the differential pressure gauge 10.

As the pressure difference continues to increase between the high pressure chamber 2 and the low pressure chamber 3 due to the accumulation of debris within the filter element, the remote indicator 58 continues to move axially towards the user selected position of the sensor 80 until the sensor 80 detects that the remote indicator 58 is within a sensing range of the sensor 80. Upon detection of the remote indicator 58, the sensor 80 generates a control signal indicating the detection of the remote indicator 58.

The control signal generated by the sensor 80 may be communicated to the controller 96 or the control signal may be communicated to an external controller or computing device (not shown) associated with operation of the differential pressure gauge 10. The controller 96 or external computing device may then analyze the control signal to determine that the maximum allowable pressure difference has been reached in response to receipt of the control signal from the sensor 80.

The controller 96 or the external computing device may be configured to perform one of a variety of different tasks associated with the determination by the sensor 80 that the maximum allowable pressure difference has been reached. The controller 96 or the external computing system may cease operation of the fluid system having the filter element or may generate a warning indicating that the filter element associated with the differential pressure gauge 10 is in need of replacement or maintenance. The warning may be a message communicated to a device accessible to the user or the warning may include activation of a visual signaling component or an auditory signaling component associated with the differential pressure gauge 10. One skilled in the art should understand that the detection of the remote indicator 58 by the sensor 80 may be communicated to any necessary components or systems using any form of control scheme without departing from the scope of the present invention.

The differential pressure gauge 10 advantageously allows a user thereof to determine when the filter element (or similar component causing a pressure drop in a fluid passing therethrough) associated with the differential pressure gauge 10 is causing a pressure drop equal to or greater than a pre-selected pressure value without requiring continual user observation of the position of the visual indicator 54 relative to the first indicia 14. The differential pressure gauge 10 also forms a safety feature wherein the sensor 80 and the controller 96/external computing device are capable of instantaneously communicating a condition of the filter element or similar component to the user to allow for the filter element or similar component to be quickly replaced or repaired, thereby preventing continued operation of the filter element or similar component in a manner that may be inefficient or potentially damaging to the fluid system having the filter element or similar component.

Additionally, the inclusion of the first stopping surface 91 and the second stopping surface 92 on the housing 20 advantageously limits the range of possible positions for the sensor 80 relative to the axial direction of the piston 40. The limiting of the range of possible positions for the sensor 80 provides a safety feature wherein the user of the differential pressure gauge 10 cannot position the sensor 80 outside of a range of expected pressure values indicating the need for replacement or maintenance of the filter element or similar component. For example, the second stopping surface 92 prevents the sensor 80 from being positioned beyond the second indicia 66 indicating a pressure drop of 22 psi, thereby effectively preventing the user of the differential pressure gauge 10 from selecting a maximum allowable pressure difference that exceeds the pressure value of 22 psi. The inclusion of the second stopping device 92 accordingly prevents an occurrence of the user setting the maximum allowable pressure difference to a pressure value corresponding to a dangerous or inefficient operating condition for any fluid system utilizing the filter element or similar component associated with the operation of the differential pressure gauge 10.

From the foregoing description, one ordinarily skilled in the art can easily ascertain the essential characteristics of this invention and, without departing from the spirit and scope thereof, can make various changes and modifications to the invention to adapt the invention to various usages and conditions.

What is claimed is:

1. A differential pressure gauge for measuring a difference in pressure present between a low pressure portion of a fluid and a high pressure portion of the fluid, the differential pressure gauge comprising:
   a cylinder including an opening extending in an axial direction of the cylinder;
   a housing including an opening extending in an axial direction of the housing, wherein the housing receives the cylinder;
   a piston extending in an axial direction thereof from a first end having a visual indicator to a second end having a remote indicator, the first end of the piston slidably disposed in the cylinder and in fluid communication with the high pressure portion of the fluid and the second end of the piston slidably disposed in the housing and in fluid communication with the low pressure portion of the fluid;
   a sensor configured to determine a presence of the remote indicator when the remote indicator is within a sensing range of the sensor, wherein the sensor is configured as a switch; and
   a sensor positioning mechanism for adjusting a position of the sensor with respect to the axial direction of the housing, the sensor mechanically coupled to the sensor positioning mechanism.

2. The differential pressure gauge of claim 1, wherein an outer surface of the housing includes at least one stopping surface for delimiting the position of the sensor with respect to the axial direction of the housing.

3. The differential pressure gauge of claim 2, wherein the at least one stopping surface is arranged transverse to the axial direction of the housing.

4. The differential pressure gauge of claim 2, wherein the at least one stopping surface includes a first stopping surface for delimiting the position of the sensor with respect to the axial direction of the housing in a first direction and a second stopping surface for delimiting the position of the sensor with respect to the axial direction of the housing in a second direction arranged opposite the first direction.

5. The differential pressure gauge of claim 4, wherein the first stopping surface and the second stopping surface are formed at opposing ends of an indented portion of the housing and the sensor is disposed within the indented portion of the housing.

6. The differential pressure gauge of claim 2, wherein the at least one stopping surface prevents the sensor from being positioned at a position with respect to the axial direction of the housing wherein the remote indicator does not reach the sensing range of the sensor when the remote indicator slides within the opening of the housing towards the sensor.

7. The differential pressure gauge of claim 1, wherein the sensing of the presence of the remote indicator by the sensor corresponds to the difference in pressure present between the low pressure portion of the fluid and the high pressure portion of the fluid being at a pre-selected value.

8. The differential pressure gauge of claim 7, wherein the pre-selected value corresponds to a maximum allowable difference in pressure present between the low pressure portion of the fluid and the high pressure portion of the fluid.

9. The differential pressure gauge of claim 1, further comprising a plate disposed adjacent the housing, the plate including a slot extending longitudinally in a direction parallel to the axial direction of the piston, a portion of the sensor positioning mechanism slidably disposed within the slot.

10. The differential pressure gauge of claim 9, wherein a plurality of indicia is disposed on the plate adjacent the slot, each of the indicia spaced from an adjacent one of the indicia in the longitudinal direction of the slot.

11. The differential pressure gauge of claim 10, wherein the sensor positioning mechanism includes a target pointing at one of the indicia disposed on the plate, wherein sliding movement of the sensor positioning mechanism within the slot causes which one of the indicia the target points at to vary.

12. The differential pressure gauge of claim 11, wherein each of the indicia corresponds to a user selected value of the difference in pressure present between the low pressure portion of the fluid and the high pressure portion of the fluid at which the presence of the remote indicator is sensed by the sensor.

13. The differential pressure gauge of claim 1, wherein the remote indicator is formed from a ferrous material and the sensor is configured to sense the presence of a ferrous material.

14. The differential pressure gauge of claim 1, wherein a plurality of indicia is one of disposed on the cylinder or disposed adjacent the cylinder, each of the indicia corresponding to a measured difference in pressure present between the low pressure portion of the fluid and the high pressure portion of the fluid.

15. The differential pressure gauge of claim 14, wherein a position of the visual indicator relative to the indicia is dependent on the difference in pressure present between the low pressure portion of the fluid and the high pressure portion of the fluid.

16. The differential pressure gauge of claim 15, wherein the spring is a compression spring disposed between the visual indicator of the piston and a portion of the housing.

17. The differential pressure gauge of claim 1, further comprising a spring opposing motion of the piston in a direction extending from the first end of the piston toward the second end of the piston.

18. The differential pressure gauge of claim 1, wherein the cylinder is formed from a transparent material to provide visual access to the visual indicator of the piston.

19. The differential pressure gauge of claim 1, wherein the cylinder is in fluid communication with a fluid passageway conveying the fluid, the fluid passageway including a filter element, wherein the high pressure portion of the fluid enters the cylinder from a position upstream of the filter element and wherein the low pressure portion of the fluid enters the housing from a position downstream of the filter element.

20. A differential pressure gauge for measuring a difference in pressure present between a low pressure portion of a fluid and a high pressure portion of the fluid, the differential pressure gauge comprising:

a cylinder including an opening extending in an axial direction of the cylinder;

a housing including an opening extending in an axial direction of the housing, wherein the housing receives the cylinder;

a piston extending in an axial direction thereof from a first end having a visual indicator to a second end having a remote indicator formed from a ferrous material, the first end of the piston slidably disposed in the cylinder and in fluid communication with the high pressure portion of the fluid and the second end of the piston slidably disposed in the housing and in fluid communication with the low pressure portion of the fluid, wherein the remote indicator threadingly engages the second end of the piston, wherein an outer diameter of the remote indicator is substantially equal to an outer diameter of a portion of the piston at the second end of the piston, and wherein the remote indicator and the portion of the piston are configured to be closely fit into the housing;

a spring urging the piston towards the high pressure portion of the fluid;

a ferrous material sensor configured to determine a presence of the remote indicator when the remote indicator is within a sensing range of the sensor;

a sensor positioning mechanism for adjusting a position of the sensor with respect to the axial direction of the housing, the sensor coupled to the sensor positioning mechanism; and a plate disposed adjacent the housing, the plate including a slot extending longitudinally in a direction parallel to the axial direction of the piston, a portion of the sensor positioning mechanism slidably disposed within the slot, a plurality of indicia disposed on the plate adjacent the slot, wherein each of the indicia corresponds to a user selected value of the difference in pressure present between the low pressure portion of the fluid and the high pressure portion of the fluid at which the presence of the remote indicator is sensed by the sensor.

\* \* \* \* \*